June 30, 1931.   E. HELIN   1,812,147
MEANS FOR PRODUCING CURVE THREADED NUTS
Filed Oct. 22, 1929    2 Sheets-Sheet 1

INVENTOR.
Elis Helin
BY: Russ, Boyer & Bakeler
ATTORNEYS

Patented June 30, 1931

1,812,147

UNITED STATES PATENT OFFICE

ELIS HELIN, OF STOCKHOLM, SWEDEN, ASSIGNOR TO CARL KINDSTROM, OF STOCKHOLM, SWEDEN

MEANS FOR PRODUCING CURVE-THREADED NUTS

Application filed October 22, 1929, Serial No. 401,442, and in Sweden July 5, 1929.

Experience has shown that a curve-threaded nut can be produced by means of a screw-tap on the conditions that the tap be tapered and provided with cutting teeth of equal height and equally spaced in the subsequent series, the tops of the teeth lying on lines which are thought drawn from the wider base to the narrower top of the tap, these lines preferably being in the form of arcs, whose radii correspond to the radius of the desired curvature of the thread, and that the nut-blank in relation to the rotating screw-tap be fed parallel to itself along an arc corresponding to the curvature of the thread. During the cutting operation, each tooth will at each revolution rise through a zone at right angles to the axis of the tap, and those zones through which passes the last tooth of the base of the tap and which determines the depth of the thread, will in no other way differ from similar zones in an ordinary straight nut cut by means of a screw-tap than that the walls of the zones are at two opposite sides bent to a small portion of the curvature of the thread, which is of no practical significance.

The present invention relates to a curve-threaded nut to be used as a lock-nut without the use of any other auxiliary means as for instance counter-nut, elastic ring, fibre packing or the like, giving nevertheless a definite and positive locking effect.

According to the invention a curve-threaded nut is produced from an apertured nut-blank by thread-cutting said nut-blank by means of a tapered screw-tap by imparting to the nut-blank and the screw-tap a relative motion composed of a rotary movement, a rectilinear movement and a reciprocating movement perpendicular to said rectilinear movement. Preferably the screw-tap performs the rotary movement and the rectilinear movement, whereas the nut-blank is adapted to perform the reciprocating movement.

The invention also relates to a screw-tap suited for carrying out the method.

Figure 1:
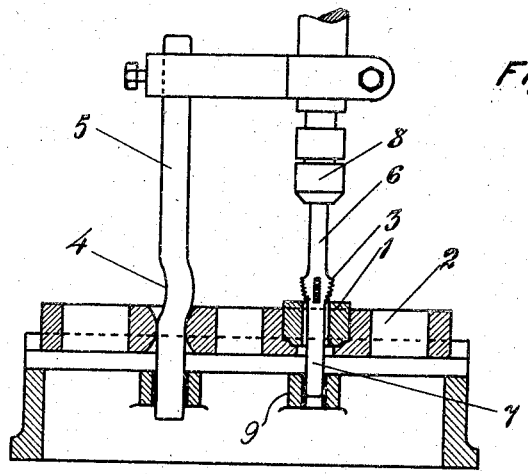
Figures 2, 3:
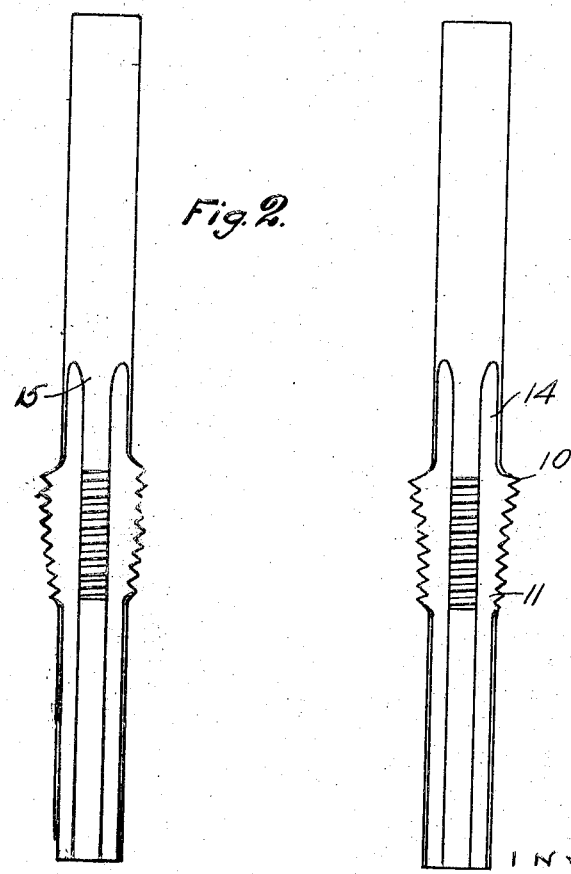

In the accompanying drawings, Fig. 1 is a schematic view of a form of construction of an apparatus for cutting a nut according to the present invention. Figs. 2 and 3 show two forms of the screw-tap, Figs. 4 to 6 and 7 to 9, respectively, show the progress of the thread-cutting in two special cases.

In the form of construction shown in Fig. 1, the nut-blank 1 is inserted in a slide-block 2 which, in relation to the rotating screw-tap 2 which, in relation to the rotating screw-tap 3, is set in movement laterally by a curved portion 4 of one or two guide-bars 5 fixed on the support of the spindle driving the screw-tap 3. The tap has two axial guiding pins 6, 7, one of which is fixed in a chuck 8, while the other runs in a bushing 9 in the bed supporting the slide-block 2.

Other known arrangements for imparting the mutual movements to the nut-blank and the screw-tap may, of course, also be used.

As shown in Figs. 2 and 3, the tops of the cutting teeth of the screw-tap follow an arc with the same radius as the desired curve of the thread, and the teeth are all of the same height, i. e. their tops and bottoms follow parallel arcs. The number of the teeth may vary.

As shown in the drawings the tap has a wider base 10 and a narrower top 11 with its greatest core diameter at the base. The curvature of the arcs formed by the tops of the cutting teeth of the tap may also be greater than that of the desired curvature of the thread.

Figure 4:
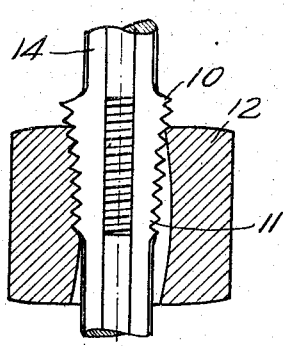
Figure 7:
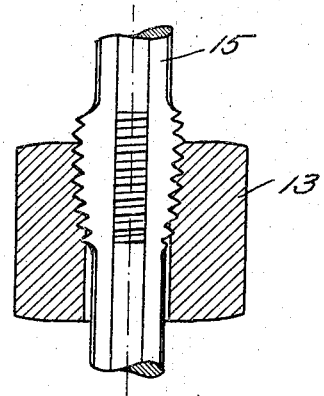
Figure 5:
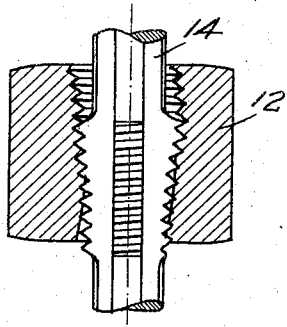
Figure 8:
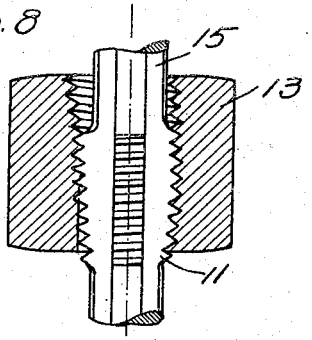
Figure 6:
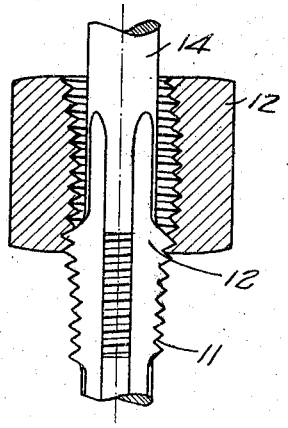
Figure 9:
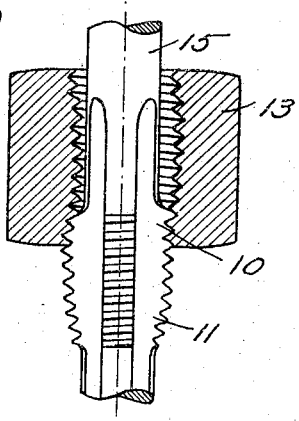

The nut-blank has a central hole, which may be bent to the desired arc, as shown in Figs. 4 to 6, or, as shown in Figs. 7 to 9, the hole in the nut-blank 13 may be straight. In the former case the diameter of the central hole is equal to the base core diameter of the tap. In the latter case, the diameter of the hole is further reduced by a layer corresponding to the height of the thread-curve.

The process of cutting the nut is shown in Figs. 4 to 9 inclusive showing the nut-blank and the screw-tap in section in successive relative positions, Figs. 4 to 6 showing a tap 14 of the type shown in Fig. 3, on which the teeth lie on inwardly curved arcs, whereas Figs. 7 to 9 show a tap 15 of the type shown in Fig. 2, on which the teeth lie on outwardly curved arcs.

Having now described my invention, what

I claim as new and desire to secure by Letters Patent is:—

1. A screw-tap for cutting curve-threaded nuts, said tap provided with cutting teeth extending over a portion having a wider base and a narrower top with its greatest core diameter at the base, the tops of the cutting teeth of the tap lying on arcs of a curvature at least equally as great as the desired curvature of the thread.

2. A screw-tap for cutting curve-threaded nuts, said tap having a tapering working portion provided with cutting teeth, the tops of the cutting teeth lying on arcs curved inwardly and of a curvature at least equally great as the desired curvature of the thread.

In testimony whereof I have signed my name to this specification.

ELIS HELIN.